United States Patent [19]

Merz

[11] Patent Number: 4,944,655
[45] Date of Patent: Jul. 31, 1990

[54] PROPELLER BLADE OF A FIBER-REINFORCED PLASTIC MATERIAL

[75] Inventor: Herbert Merz, Munich, Fed. Rep. of Germany

[73] Assignee: MTU Motoren- und Turbinen-Union Munich GmbH, Fed. Rep. of Germany

[21] Appl. No.: 348,878

[22] Filed: May 8, 1989

[30] Foreign Application Priority Data

May 10, 1988 [DE] Fed. Rep. of Germany ....... 3815906

[51] Int. Cl.⁵ .................. B63H 1/00; B63H 3/00; B63H 5/00; B63H 7/00
[52] U.S. Cl. .................................. 416/61; 416/230; 416/224; 416/146 R; 416/95
[58] Field of Search ............... 416/61, 224, 226, 95, 416/146 R, 230 R, 230 A

[56] References Cited

U.S. PATENT DOCUMENTS

| | | | |
|---|---|---|---|
| 2,491,172 | 12/1949 | Forsyth | 416/146 R |
| 2,591,757 | 4/1952 | Young | 416/95 |
| 2,648,388 | 8/1953 | Haines et al. | 416/95 |
| 3,176,775 | 4/1965 | Clemens | 416/230 A |
| 3,923,421 | 12/1975 | Carter et al. | 416/224 |
| 4,006,999 | 2/1977 | Brantley et al. | 416/230 X |
| 4,095,322 | 6/1978 | Scarpati et al. | 416/230 A X |
| 4,111,600 | 9/1978 | Rothman et al. | 416/224 X |
| 4,524,620 | 6/1985 | Wright et al. | 416/61 X |
| 4,648,921 | 3/1987 | Nutter | 416/226 X |
| 4,784,575 | 11/1988 | Nelson et al. | 416/224 X |

FOREIGN PATENT DOCUMENTS

| | | | |
|---|---|---|---|
| 3015208 | 11/1981 | Fed. Rep. of Germany ... | 416/230 R |
| 233496 | 11/1944 | Switzerland | 416/224 |
| 0440655 | 1/1936 | United Kingdom . | |
| 538385 | 7/1941 | United Kingdom | 416/224 |
| 0653159 | 5/1951 | United Kingdom . | |
| 0669112 | 3/1952 | United Kingdom . | |
| 0737245 | 9/1955 | United Kingdom . | |
| 1320539 | 12/1971 | United Kingdom . | |
| 1267571 | 3/1972 | United Kingdom . | |
| 1503687 | 12/1974 | United Kingdom . | |
| 1500776 | 2/1978 | United Kingdom | 416/224 |
| 2166202 | 4/1986 | United Kingdom | 416/224 |

Primary Examiner—Edward K. Look
Assistant Examiner—Thomas Denion
Attorney, Agent, or Firm—Evenson, Wands, Edwards, Lenahan & McKeown

[57] ABSTRACT

A propeller blade of fiber-reinforced plastic with a combined erosion, icing and lightning protection system has a metal shroud fitted to its leading edge, the shroud enclosing a cavity and accommodating a heating conductor at its interior. A ground line of the heating conductor is connected to ground and serves as a lightning conductor.

20 Claims, 2 Drawing Sheets

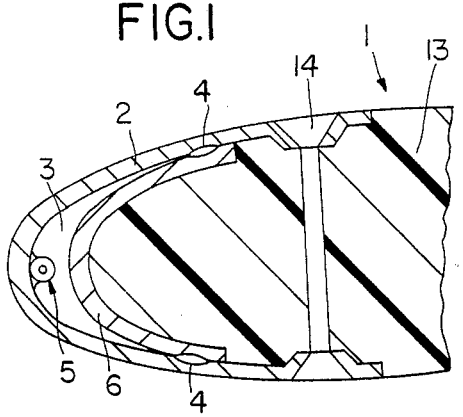
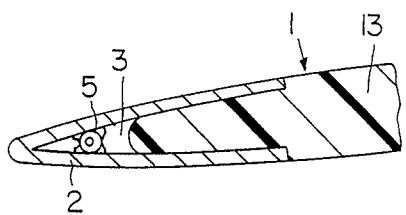
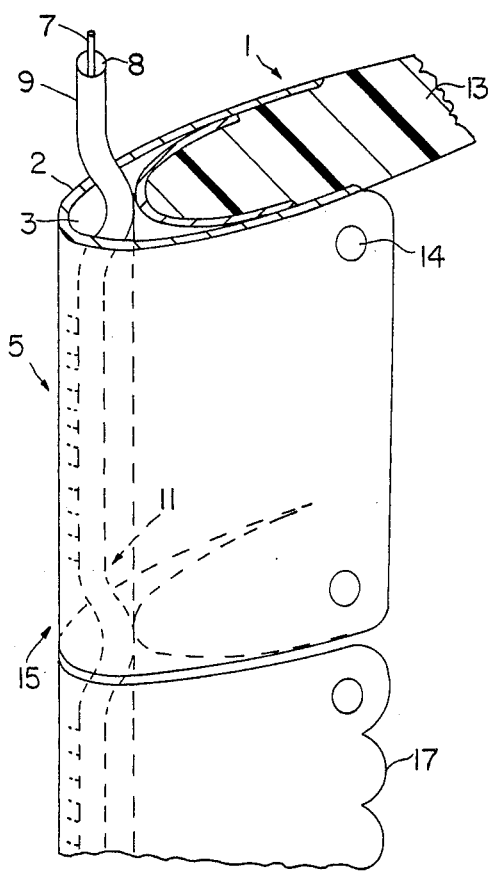
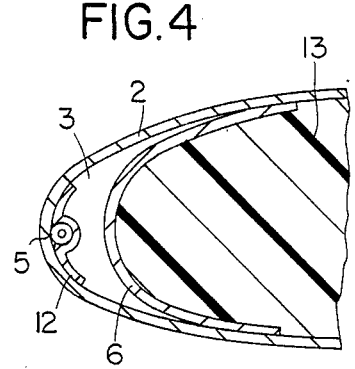
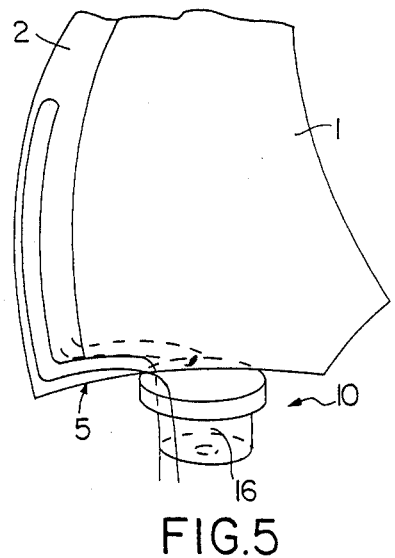

PROPELLER BLADE OF A FIBER-REINFORCED PLASTIC MATERIAL

BACKGROUND AND SUMMARY OF THE INVENTION

This present invention generally relates to a propeller blade constructed from a plastic material such as a fiber-reinforced plastic material, and more particularly to an arrangement for protecting the structural integrity of a plastic propeller blade as well as indicating the occurrence of foreign object damage (FOD) to a leading edge of the propeller.

Fan blades of turbo engines and propellers have previously been manufactured from composite materials including fiber-reinforced plastic materials. These materials give great strength and low weight, but are detrimentally effected by a high sensitivity to rain and particle erosion (e.g. insects). Further, such composite fan blades and propellers are easily damaged by impinging large-size foreign bodies, such as chunks of ice, rocks, birds, etc. (FOD).

The above-noted drawbacks apply particularly to the slim, sharp leading edges of such composite-material propellers or fan blades, all the more so with increasing relative velocity between the propeller and the impinging particle. At the same time, the need to maintain high aerodynamic efficiency does not permit any changes in profile of the leading edge.

A known practice to protect, e.g. wooden propellers of composite-material helicopter rotor blades, has been to provide them with a metal coating or cladding on the leading edge. However, while FOD to translucent and impact-resistant fiber materials, such as glass fiber reinforced plastic materials and aramide fiber-reinforced plastic materials, is indicated by the resultant surface delamination, even the most severe internal FOD often remains invisible in carbon fiber-reinforced materials and therefore are quite difficult to detect. However, in the known practice of protecting propeller blades with a metal coating or cladding, no provision is made for indicating severe FOD to the structure of the blade, i.e. give early warning without sacrificing the protective functions.

Icing risk is another problem afflicting propellers. Ice buildup on the blades greatly impairs aerodynamic propulsion, and the high-velocity ice particles hurled off the propeller additionally jeopardize the airframe structure. Also, considerable engine imbalances may result.

Several known deicing methods exist, such as by pulsating inflatable rubber air cells (Goodrich anti-ice boot), by chemical deicing through alcohol or glycol spray (see FAA Advisory Circular 20-117), by hot bleed air from the engine, or by electrical resistance heating conductors fitted to the airfoil.

Another problem with plastic propeller blades is posed by the fact that such propellers or profan rotors are among the structures most probably struck by lightning. Carbon fiber-reinforced plastic materials are especially sensitive to lightning damage owing to their partial electrical conductivity in that the fiber is conductive while the plastic matrix is insulating.

Therefore, it is an object of the present invention to provide a propeller blade constructed from a composite material with protection from erosion, FOD and icing in combination with lightning protection in a complemental, redundant arrangement.

It is a further object of the present invention to provide a propeller blade constructed from a composite material with a metal shroud at the leading edge of the propeller which is spaced from the plastic airfoil of the blade by a cavity having electrical conductors.

The combination of features provided in accordance with certain preferred embodiments of the present invention provides a number of advantages. For example, the metal shroud spaced apart from the plastic airfoil of the propeller blade proper protects the airfoil from the erosive effects of small particles or rain drops. When a large-size body impinges, as perhaps a bird, the metal shroud is dented to absorb sufficient impact energy to prevent damage to the plastic profile behind it. The deformation is recognized also at surface inspections, enabling the damaged blade or metal shroud to be replaced. Deformation of the metal shroud prevents the blade from being weakened structurally; it merely impairs the aerodynamic flow around the blade at this point. Severe deformation of the metal shroud suggests possible internal FOD to the plastic propeller and therefore further inspection of the blade.

The cavity provided between the metal shroud and the plastic airfoil can advantageously be utilized for ducting hot deicing air, which is diverted from the compressor or consists of fresh air routed through an exhaust gas heat exchanger, so that icing of the critical airfoil leading edge is prevented. Provision for blowing off the air from the propeller blade can be made at the joints of the metal shroud or at the blade tip.

Also providing deicing features is the advantageous provision of an electrical heating conductor connected to the metal shroud to conduct heat. This serves to effectively heat the metal shroud at a stagnation point area, which is especially jeopardized by icing, while simultaneously protecting the temperature-sensitive plastic material, the air space between the metal shroud or heating conductor and the plastic airfoil serving to provide thermal insulation.

Additionally, the metal shroud advantageously discharges current when lightning hits the plastic propeller blade, so that the flash will not stress current-sensitive composite fiber materials. Serving to discharge the lightning current is also the grounded ground return of the electrical heating conductor.

In a further advantageous feature of preferred embodiments of the present invention, a second metallic inner shroud is conformally fitted to the plastic propeller blade surface and is connected to the outer metal shroud. This inner shroud is preferably arranged near a hub area of the propeller blade and gives additional protection of the plastic airfoil in the event of FOD and permits improved fixation of the outer metal shroud. Preferably, the inner shroud is welded to the outer metal shroud and bonded to the plastic airfoil. The weld joint is preferably roller seam welded or alternatively spot welded.

In an advantageous embodiment of the present invention, the metal shroud has a number of sections arranged along the direction of blade span. This helps to offset thermal expansion of the metal shroud and reduces the risk of fatigue fracture as a result of different moduli of elasticity of metal and plastic, respectively. This also enables the replacement of individual sections upon damage.

Preferred materials for the metal shroud are titanium, titanium alloys, INVAR steel and maraging steel alloys.

In a preferred embodiment of the spanwise edge of the metal shroud and the plastic airfoil, the adhesion of the edges under centrifugal load is improved by giving them a zig-zag or circular arc shape.

In an advantageous feature of preferred embodiments of the present invention, the heating conductor takes the shape of a coaxial conductor having an inner conductor, an insulating layer enveloping it, and a metallic shroud tube. This permits the heating conductor to be advantageously connected to the metal shroud by brazing or other process. The shroud tube also serves to increase the metallic cross-sectional area and so reduces the conductor resistance to improve the current discharge when lightning strikes.

In a preferred embodiment of the present invention, the heating conductor is brazed to the metal shroud in sections, and at intermediate sections is curved inwards to form expansion bends. This serves to reduce mechanical and thermal stresses caused in the heating conductor by differences in temperature and thermal expansion between metal and plastic. In one embodiment of the present invention the heating conductor is attached by regularly spaced heat conduction lugs, which improves the dissipation of heat to the metal shroud and advantageously stiffens the shroud.

Deicing/heating of the radially outer propeller areas is not invariably required, because the high peripheral speed prevents icing. In a further feature of preferred embodiments of the present invention, therefore, the heating conductor is provided only along a portion of blade span and is eliminated wherever continuous heating is difficult for lack of space in the sharp-edged outer zone of the propeller airfoil or where the heating conductor is not durable enough to safely withstand the increased flexural vibration in the upper blade section. In an advantageous embodiment, the heating conductor is then looped with forward and return lines running parallel to produce uniform heating of the metal shroud.

In a further feature of the present invention, the radially outer tip of the plastic propeller blade is clad with a metallic protective cap which electrically conductively connects to the metal shroud and the shroud tube of the heating conductor. This cap forms a flash entry or exit point, which is especially threatened by destruction through lightning, and it additionally protects the blade tip of the plastic propeller from mechanical damage. The conductor area of the lightning protection provision is preferably increased by installing one or several metallic conductor strips to run the length of the blade from the protective cap to the propeller hub and grounding them. In a preferred embodiment, electrically insulated flat metal conductors are formed, bonded and embedded into the pressure side of the airfoil below an erosion protection skin extending over the entire propeller blade.

Given suitable design and selection of material these lightning conductors are a little less durable than the plastic propeller blade. This provides a substantial advantage, considering that fatigue failure of the lightning conductors can be detected by electrical resistance test between the blade tip and the hub to give a simple maintenance criterion for further airworthiness checks on the propeller system.

The advantages provided by the propeller blade protection system of preferred embodiments of the present invention, therefore, include its deicing capability and simultaneously, its redundancy with respect to multiple lightning strikes, its suitability for testing by simple visual inspection and simple electrical resistance check, and the ease with which damaged individual components can be replaced.

Other objects, advantages and novel features of the present invention will become apparent from the following detailed description of the invention when considered in conjunction with the accompanying drawings.

BRIEF DESCRIPTION OF THE DRAWINGS

FIG. 1 is an enlarged cross-sectional schematic view illustrating a propeller blade leading edge near a propeller hub, constructed according to a preferred embodiment of the invention, FIG. 2 is a cross-sectional view illustrating the propeller blade leading edge near a propeller tip, of the propeller blade of FIG. 1, FIG. 3 is a perspective view of yet another embodiment of the present invention showing the blade leading edge attachment and parting joints in schematic arrangement, FIG. 4 is a cross-sectional view illustrating an alternative embodiment for attaching the heating conductor to the propeller blade leading edge near the propeller hub of the propeller blade, FIG. 5 is a perspective view illustrating a further embodiment of the propeller blade in schematic arrangement wherein looped heating conductors are employed.

DETAILED DESCRIPTION OF THE DRAWINGS

Figure 6:
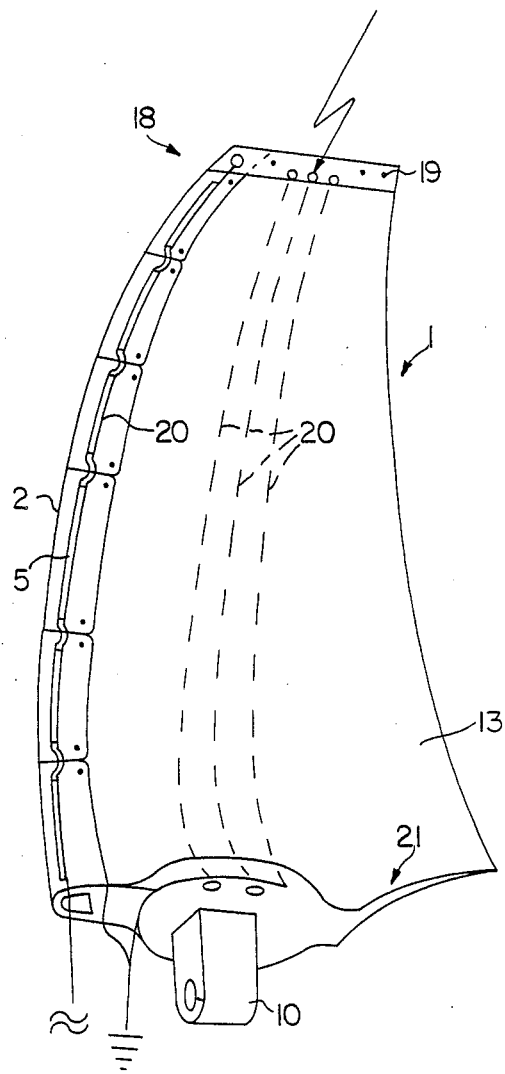
FIG. 6 is a perspective, schematic view illustrating still another embodiment of the propeller blade including an integrated overall protection system.

In FIG. 1, a cross-sectional view of the leading edge of a propeller 1 taken near the propeller hub shows a U-section metal shroud 2 fitted to a plastic airfoil 13 to form an aerodynamic wing contour. The metal shroud 2 is connected to the plastic airfoil 13 through a number of rivets 14 spread over the entire extent of the metal shroud 2 and the propeller airfoil 1, respectively. The leading edge of the plastic airfoil 13 is surrounded by an inner shroud 6 bonded to the plastic airfoil 13 and attached to the outer metal shroud 2 by spot, roller seam or other welding methods. Attached to the inner wall of the metal shroud 2 preferably by brazing is also a heating conductor 5 to provide a thermally conductive connection.

In FIG. 2, the same propeller blade 1 as in FIG. 1 is shown in cross-sectional view near the blade tip, where the profile exhibits a substantially sharper edge. Unlike the section near the hub (FIG. 1), this area has no inner shroud. Also, the metal shroud 2 is bonded to the plastic airfoil 13. The heating conductor 5 is attached to the two inner surfaces of the metal shroud 2 facing one another in V-arrangement.

In FIG. 3, an oblique view of the leading edge of propeller blade 1 in schematic arrangement shows how the metal shroud 2 around the forward portion of the plastic airfoil 13 is attached by rivets 14. The metal shroud 2 shown in FIG. 3 has a number of partial sections composed at parting joints 15. The heating conductor 5 has an inner conductor 7, an insulating layer 8 surrounding it, and a coaxial shroud tube 9 brazed to the metal shroud 2. In the area of the separating joint 15, the heating conductor 5 exhibits expansion bends 11, so that at these points the heating conductor 5 is not connected to the metal shroud 2 but is bent into the interior of the cavity 3. According to one embodiment, the joining edge 17 is bow-shaped.

FIG. 4 illustrates an alternative or additional embodiment for attaching the heating conductor 5 to the metal shroud 2 by way of thermally conductive lugs 12 preferably arranged in the near-hub area of the metal shroud 2.

FIG. 5 illustrates an embodiment featuring a looped heating conductor 5 to heat the blade leading edge in the area of the blade root 10 only.

The metal shroud 2, which is heated by the heating conductor 5, can additionally be heated also by hot air injected into the roughly indicated cavity 3 through a hot air duct 16 in the interior of the propeller blade 1, the duct being shown in schematic arrangement in FIG. 5.

In FIG. 6 the propeller blade 1 is illustrated in a perspective view and has a sectional metal shroud extending along the length of the leading edge of the propeller, the blade tip 18 being covered by a metallic protective cap 19. The cap 19 is connected to the heating conductor 5 at the interior of the metal shroud 2 and to a number of lightning conductors 20 routed along the pressure side 21 of the airfoil below the outer skin.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. Propeller blade having a blade span and positioned at a propeller blade hub including metallic parts, the propeller blade comprising:
   a fiber reinforced plastic airfoil section;
   an outer shroud constructed from a thermally and electrically conductive, deformable material forming a leading edge of the plastic airfoil section;
   cavity means formed by the plastic airfoil section and outer shroud, the cavity means separating the outer shroud and the plastic airfoil section of the blade and extending in a direction of the blade span of the propeller blade;
   electrical deicing means within the cavity means and in thermal and electrical contact with the outer shroud, the electrical deicing means including a heating conductor and grounding means for electrically grounding the outer shroud;
   lightning protection means comprising the outer shroud and the grounding means of the electrical deicing means as lightening conductors; and
   connecting means for connecting the lightening protection means to the metallic parts of the propeller blade hub.

2. Propeller blade of claim 1, wherein an inner shroud includes means for conformally fitting the inner shroud to a propeller blade surface and for connecting the inner shroud to the outer shroud, the inner shroud being constructed from a thermally and electrically conductive, deformable material.

3. Propeller blade of claim 2, wherein the inner shroud is connected to the outer shroud by a roller seam weld.

4. Propeller blade according to claim 1, wherein the outer shroud comprises a number of sections successively arranged along the leading edge of the blade in a direction of the blade span.

5. Propeller blade according to claim 1, wherein the heating conductor is a coaxial line having an inner conductor, an insulating layer surrounding it, and a metallic shroud tube.

6. Propeller blade according to claim 5, wherein the heating conductor is brazed to the outer shroud in sections and is curved inwardly at intermediate sections of the leading edge to form expansion bends.

7. Propeller blade according to claim 6, wherein the heating conductor is attached by heat conductor lugs.

8. Propeller blade according to claim 1, wherein the heating conductor is provided only along certain portions of the blade span.

9. Propeller blade according to claim 8, wherein the heating conductor is looped, with forward and back heating conductor lines extending in a parallel arrangement.

10. Propeller blade according to claim 1, wherein the outer shroud is attached to the plastic airfoil section of the blade by at least one of a bonding and riveting.

11. Propeller blade according to claim 1, wherein a joining edge between the outer shroud and the plastic airfoil section has at least one of a saw tooth and circular arc configuration.

12. Propeller blade according to claim 4, wherein the inner shroud extends from a blade root over only a portion of the blade span.

13. Propeller blade according to claim 1, the outer shroud is made of titanium, a titanium alloy or a maraging steel.

14. Propeller blade according to claim 1, wherein a blade tip is provided with a metallic protective cap.

15. Propeller blade according to claim 14, further comprising at least on lightning protection conductor which is connected from the protective cap to a blade root for electrical conduction and grounding.

16. Propeller blade according to claim 15, wherein the at least one lightning conductor comprises ribbon-shaped metal strips.

17. Propeller blade according to claim 15, wherein the at least one lightning conductor is routed on a pressure side of the airfoil and is masked with erosion inhibiting means.

18. Propeller blade according to claim 15, wherein the at least one lightning conductor exhibits a durability slightly inferior to that of the propeller blade.

19. Propeller blade according to claim 15, wherein the at least one lightning conductor comprises means for verifying the fatigue performance of the propeller blade.

20. Propeller blade according to claim 15, wherein the metallic protective cap is connected to the outer shroud and a metal shroud tube of a coaxial line having an inner conductor separated from the shroud tube by an insulating layer, the coaxially line comprising the heating conductor and the grounding means.

* * * * *